Figure 1:
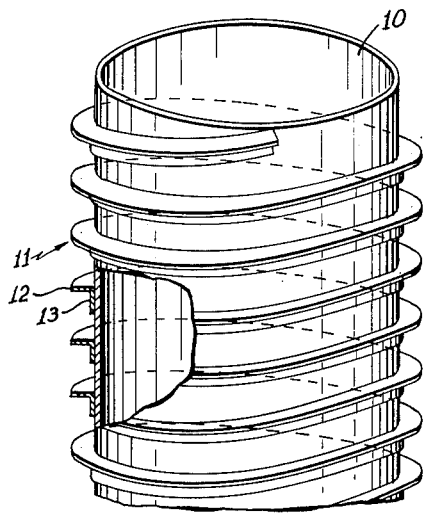

Feb. 3, 1953 H. C. WITTHOFT 2,627,083
CABLE VULCANIZING SUPPORT
Filed April 22, 1950

INVENTOR
Herbert C. Witthoft
BY
Pennie, Edmonds, Morton and Barrows
ATTORNEYS

Patented Feb. 3, 1953

2,627,083

UNITED STATES PATENT OFFICE 2,627,083

CABLE VULCANIZING SUPPORT

Herbert C. Witthoft, Marion, Ind., assignor to Anaconda Wire and Cable Company, a corporation of Delaware Application April 22, 1950, Serial No. 157,466

1 Claim. (Cl. 18—6)

This invention relates to the manufacture of rubber insulated electric power cable and more particularly is concerned with apparatus for supporting the cable during vulcanization of the rubber composition insulation.

There are two general methods for making rubber insulated power cables. The first of these comprises wrapping unvulcanized rubber insulating compound in strip form about a conductor, enclosing the wrapped conductor in a lead sheath, vulcanizing the rubber inside such sheath, and thereafter stripping the lead sheath from about the insulated cable. The second method is to pass the conductor through an extrusion apparatus in which unvulcanized rubber insulating compound is extruded onto the conductor. The thus-covered conductor (sometimes after taping with one or more compound-filled fabric tapes) is wound upon a horizontal cylindrical drum. The insulated cable so supported by the drum is placed within a vulcanizing chamber and heated to vulcanize the rubber insulation.

It is with the latter general method that I am here concerned. Unfortunately the best additive materials, electrically, for rubber of good insulating quality, are organic in nature and ordinarily thermoplastic and as a matter of fact, some thermoplastics themselves are admirable fillers for the rubber compound. One such material is polyethylene. These additive materials and therefore the rubber compounds of which they form a part generally soften at a temperature substantially below the vulcanizing temperature ordinarily used. Additionally, the best thermosetting polymers for use in rubber compound insulations, perhaps the best of which is butyl rubber, are very slow to vulcanize. When a butyl rubber compound, for instance, is used for cable insulation purposes the vulcanizing temperature is in the neighborhood of 280° F. and if in this case the thermoplastic filler is polyethylene the compound will soften at approximately 220° F.

In view of the relative slowness of the rubber to vulcanize it will be understood that when a cable to which a layer of unvulcanized rubber has been applied is wound upon a horizontal drum and is placed in a vulcanizing chamber, the insulation will become soft before it becomes vulcanized. Thus the insulated cable, which must necessarily be wound fairly closely about the drum in order to be supported thereby, will first tend to flatten out against the drum and the resulting vulcanized cable will have a slightly flattened side. This flattening will be greatest in that portion of the cable at the top of the drum as that portion supports, in addition to its own weight, part of the weight of that portion of the cable wound about the lower part of the drum.

Such flattening of the insulation of high voltage cable is undesirable because the conductor is not then uniformly insulated and when fairly close tolerances with respect to insulation thickness are required, the insulation may be below specification at the flat portions and therefore unusable or dangerous to use.

It is the object of this invention to provide a support for rubber insulated cable during the vulcanization of the rubber, which supports the cable in such a manner that the tendency of the insulation to flatten during vulcanization is minimized, if not completely eliminated.

A support, according to the invention, comprises a vertical drum or frame having secured to its outer face a laterally extending cable-supporting shelf in the form of a multiple-turn helix. The pitch of the shelf is relatively small so that successive turns of it are fairly close together and space is conserved. Each length of the shelf supports only the length of cable resting upon it and not any of the cable in the lower windings about the drum. In other words, the insulation of each portion of the cable is subject to flattening only to the extent caused by the weight of that portion of the cable. If desirable, the shelf may be curved in cross-section, the curvature of the shelf being substantially similar to the curvature of the outer surface of the insulation of the insulated cable to be supported thereby and the shelf having its concave face directed upwardly to receive the insulated cable, whereby support may be more evenly spread over the lower half of the cable insulation rather than along one line of contact as will be the case if the shelf is flat.

The invention also contemplates a support comprising an inner drum or frame to which is secured a multiple-turn helical shelf and an outer drum adapted to surround the inner drum and inner shelf and to have a multiple-turn helical shelf on its outer surface. The pitch of the inner shelf is opposite to that of the outer shelf whereby twice as much cable may be supported in the same vertical space as could be supported by the single drum support.

Figure 2:
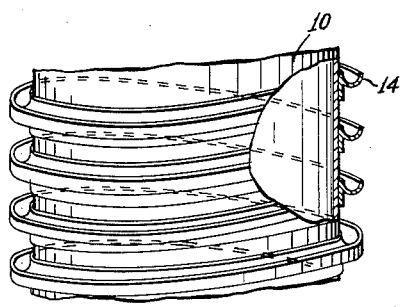
Figure 3:
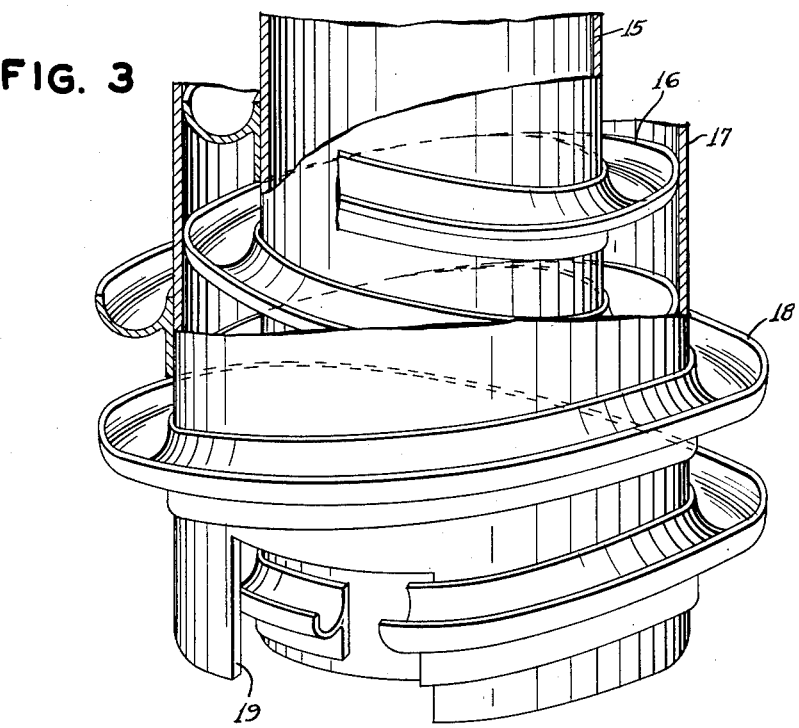

Several forms of vulcanizing drums, constructed in accordance with my invention, are illustrated in the accompanying drawings in which:

Fig. 1 is an elevational view, partly in section, of a drum having a flat helical shelf, Fig. 2 is a partial elevation of a similar type of drum having a shelf curved concavely downwardly in cross-section, and Fig. 3 is an elevation, partly in section, of my double-drum (or frame) type of support.

In Fig. 1 there is shown a cylindrical drum 10 to the outer surface of which is secured a helical shelf 11. The shelf is in the form of an angle iron having arms 12 and 13. Arm 13 may be secured in any manner, for instance by welding, to the drum, and arm 12 is then adapted to support a cable wound about the drum. For use in supporting a cable to be vulcanized, the support of Fig. 1 is mounted in a vertical position so that a cable wound about the drum has each unit of its length supported by a corresponding unit of length of the shelf.

The support shown in Fig. 2 is identical to that of Fig. 1 except that the laterally extending portion of the shelf 14 is curved in cross-section rather than being flat as was the portion 12 of the shelf in the structure of Fig. 1. The curvature of the shelf may, as has been stated above, be substantially similar to the curvature of the outer surface of the insulation of the insulated cable to be supported and the concave face of the shelf is directed upwardly to receive the insulated cable. The support of Fig. 2 is used in the same manner as is that of Fig. 1, but it will be noted that the supporting force exerted by shelf 14 upon the cable will be spread about the lower surface of each portion of the cable rather than being exerted along one line of contact as in the case of the shelf 11 of Fig. 1.

Another form of support is shown in Fig. 3 by which a considerably increased length of cable can be supported in the same vertical space as is occupied by the structure of Figs. 1 and 2. It comprises an inner drum 15 to the outer surface of which is secured a helical shelf 16. A second drum 17, of a diameter sufficiently large to surround both the inner drum 15 and its helical shelf 16, is also provided and has a laterally extending helical shelf 18 secured to its outer surface. Both of the shelves 16 and 18 are of the type shown in Fig. 2, but of course shelves similar to that shown in Fig. 1 might be here employed. It will be noted that shelf 18 of the outer drum is pitched in the opposite direction to shelf 16 of the inner drum so that a cable wound downwardly about one drum may continue upwardly about the other, thus conserving vertical space. At the lower end of the outer drum 17 an opening 19 is provided through which the cable may pass from support by shelf 16 on the inner drum to support by shelf 18 on the outer drum.

In using the apparatus of Fig. 3 a cable of a length longer than can be supported by one drum is first wound about the inner drum 15 until the inner shelf 16 is filled. Then the outer drum 17 is lowered into place around the inner drum 15 and inner shelf 16, with the cable extending through opening 19. The remainder of the cable is then wound about drum 17 and supported by shelf 18.

Although in each form of apparatus shown and described a drum, such as could be made from sheet metal, is employed to support the multi-turn helical shelf, it should be understood that open frames or lattice-work structures might be as readily employed for such purpose and the invention is specifically intended to include such alternative means for supporting a shelf.

It will be noted that in each form of the invention no portion of the insulation of a supported cable is called upon to support any more weight than its own plus the weight of the portion of the conductor which it surrounds. Thus the tendency towards flattening of the insulation due to softening of the filler material of the compound during the vulcanization process, and before it has become tough and non-deformable as a result of vulcanization, will be decreased to a minimum.

I claim:

Apparatus for supporting a long length of rubber-covered cable or the like substantially throughout its length, comprising an inner vertical frame having a laterally extending inner cable-supporting shelf in the form of a multiple-turn helix attached to its outer surface, an outer frame surrounding said inner frame and inner shelf and having a laterally extending outer cable-supporting shelf in the form of a multiple-turn helix attached to its outer surface, the pitch of said outer helical shelf being opposite to that of said inner helical shelf, and said outer frame being formed with an aperture adjacent its lower end through which the rubber-covered cable may pass from support by the inner shelf to support by the outer shelf.

HERBERT C. WITTHOFT.

REFERENCES CITED

The following references are of record in the file of this patent:

UNITED STATES PATENTS

| Number | Name | Date |
|---|---|---|
| 561,229 | Kern et al. | June 2, 1896 |
| 596,819 | Moseley | Jan. 4, 1898 |
| 1,634,160 | Semple | June 28, 1927 |
| 1,674,574 | Semple | June 19, 1928 |
| 1,837,502 | Thompson | Dec. 22, 1931 |

FOREIGN PATENTS

| Number | Country | Date |
|---|---|---|
| 519,798 | Great Britain | Apr. 5, 1940 |